(12) United States Patent
Goetting et al.

(10) Patent No.: US 10,627,300 B2
(45) Date of Patent: Apr. 21, 2020

(54) METHOD FOR MEASURING TORQUE OF A DRIVE UNIT

(71) Applicant: Robert Bosch GmbH, Stuttgart (DE)

(72) Inventors: Gunther Goetting, Stuttgart (DE); Michael Bildstein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 73 days.

(21) Appl. No.: 16/063,548

(22) PCT Filed: Aug. 30, 2016

(86) PCT No.: PCT/EP2016/070387
§ 371 (c)(1),
(2) Date: Jun. 18, 2018

(87) PCT Pub. No.: WO2017/102112
PCT Pub. Date: Jun. 22, 2017

(65) Prior Publication Data
US 2019/0003909 A1    Jan. 3, 2019

(30) Foreign Application Priority Data
Dec. 17, 2015   (DE) .................. 10 2015 225 696

(51) Int. Cl.
*G01L 3/00*       (2006.01)
*G01L 3/10*       (2006.01)
*G01L 3/14*       (2006.01)

(52) U.S. Cl.
CPC ............ *G01L 3/106* (2013.01); *G01L 3/1435* (2013.01); *G01L 3/1442* (2013.01)

(58) Field of Classification Search
CPC ...... G01L 3/106; G01L 3/1435; G01L 3/1442

USPC ...................................... 73/962.325, 862.325
See application file for complete search history.

(56) References Cited

U.S. PATENT DOCUMENTS

| 3,878,718 A | 4/1975 | Sugiyama et al. |
| 4,202,205 A * | 5/1980 | Carpenter ............... G01M 1/10 73/1.14 |
| 2008/0209994 A1 * | 9/2008 | Matsumoto ............. G01L 5/167 73/116.07 |

(Continued)

FOREIGN PATENT DOCUMENTS

| CN | 101183034 A | 5/2008 |
| CN | 102628718 A | 8/2012 |
| DE | 10006534 A1 | 10/2001 |

(Continued)

OTHER PUBLICATIONS

International Search Report with English translation and Written Opinion for Application No. PCT/EP2016/070387 dated Nov. 23, 2016 (18 pages).

*Primary Examiner* — Max H Noori
(74) *Attorney, Agent, or Firm* — Michael Best & Friedrich LLP

(57) ABSTRACT

The invention relates to a method for measuring the torque of a drive unit (10), particularly a vehicle drive unit (10), said drive unit (10) comprising at least one bearing (20) for connecting to a fixed support point (21), and at least one sensor (22) being provided which measures a change in force and/or position, particularly a relative rotation of the drive unit (10), as a sensor value, wherein a torque at the drive unit (10) is determined as a measurement value on the basis of said sensor value.

22 Claims, 2 Drawing Sheets

(56) References Cited

U.S. PATENT DOCUMENTS

2014/0029879 A1\* 1/2014 Brehm .................... G01L 3/102
                                                      384/446

FOREIGN PATENT DOCUMENTS

| DE | 102012222854 A1 | 6/2014 |
|----|-----------------|--------|
| EP | 0354386 A1 | 2/1990 |
| EP | 0741286 A2 | 11/1996 |
| FR | 2890737 A1 | 3/2007 |
| JP | S52124532 A | 10/1977 |
| JP | S5872018 A | 4/1983 |
| JP | S59111028 A | 6/1984 |
| JP | H11183277 A | 7/1999 |
| JP | 2016130730 A | 7/2016 |

\* cited by examiner

METHOD FOR MEASURING TORQUE OF A DRIVE UNIT

BACKGROUND OF THE INVENTION

The present invention concerns a method for measuring the torque of a drive unit and a measuring system for measuring the torque of a drive unit.

For the operation of modern vehicles, information about the torque applied in the drive train is necessary, for example for the calculation of the reference speed and the actual acceleration. In addition, said information is used for monitoring tasks (monitoring in the torque path). Said data are usually determined from models (air and injection quantities or current data for electrical drives).

SUMMARY OF THE INVENTION

According to the invention, the method is used for measuring a torque of a drive unit, in particular a vehicle drive unit, wherein the drive unit comprises at least one bearing for connecting to a fixed support point and wherein at least one sensor is provided that measures a change in force and/or position as a sensor value, in particular a relative twist of the drive unit, and determines a torque that is applied to the drive unit as a measurement value based on the sensor value.

Further features and details of the invention arise from the subordinate claims, the description and the drawings. In this case, features and details that have been described in connection with the method according to the invention of course also apply in connection with the system according to the invention and vice-versa respectively, so that regarding the disclosure, reciprocal reference is or can always be made to the individual aspects of the invention.

The method according to the invention enables a torque measurement during the ongoing operation of a drive unit without directly measuring the torque applied to a drive shaft, which has a high associated measurement cost. This is achieved as a result of at least one sensor measuring a change in a force and/or a position as a sensor value, in particular a relative twist of the drive unit. Because of a torque being applied to the drive unit, the drive unit moves as a result of the torque in relation to the fixed support point or a measurable force acts on the bearing of the drive unit. It is thus possible inter alia to measure a change in position, in particular a relative twist of the drive unit in relation to the fixed support point.

The method according to the invention provides additional information about the applied torque of the drive unit, which can be used for the regulation of driving functions, for example. Moreover, the measurement value can be used for monitoring the torque that is provided and for comparing other signals such as measurement values of the machine currents or the angular position of the rotor.

The torque produced by the drive unit results in a change in the force on the elastic bearing of the drive unit or in a relative change in position, in particular a relative twist of the drive unit, in relation to the fixed support point. Based on the sensor value that is measured in this way, which represents a change in a force and/or a position, in particular a relative twist of the drive unit, a torque that is applied to the drive unit can be determined as a measurement value. In this case, the measurement of the sensor value and the torque determined therefrom and/or using a time derivation can accordingly be essentially constantly analyzed as a quasi-stationary measurement of the torque. By using the time derivation, a faulty build-up of the torque of the drive unit can be recorded and inhibited by suitable control technology measures. Moreover, torque oscillations arising through the stimulation of natural frequencies can be detected by means of the time derivative and attenuated or inhibited by control technology measures. For this purpose, a measurement of the sensor value preferably takes place with a sufficiently high frequency or in a definable interval. For example, a fixed support point can mean a vehicle body within the scope of the invention.

Advantageously, a control unit can be provided, wherein the control unit has a signal connection to the at least one sensor and determines the measurement value from the sensor value. The control unit processes and analyzes the measurement signals in the form of the sensor value or the sensor values and determines the measurement value for the torque on the basis of an algorithm that is present in the control unit and/or heuristically. The signal connection of the control unit to the at least one sensor can be made via cable and/or wirelessly in this case. The data interface for transmitting the sensor value to the control unit can for example be in the form of a Bluetooth connection and/or an NFC connection and/or a Wireless-LAN connection and/or a GSM connection or an LTE connection for the transmission of the data. The control unit can for example be an internal vehicle control unit that is suitable at the same time for controlling driving functions and/or comparing other signals for processing the measurement values of the machine currents and/or the angular position of the rotor. Moreover, it is conceivable that the control unit and/or the at least one sensor transmit(s) the sensor value and/or the measurement value to a unit outside the vehicle, in particular a mobile unit, so that the data can be read and analyzed by an external or mobile unit. The data can be used in a test station or in a workshop for example, so that the data of the drive unit related to the torque can be analyzed in a simple manner. Moreover, it is conceivable that the control unit data can be determined from models of the air and injection quantities or the current data of an electrical drive unit. As a result, monitoring can be provided in the torque path, wherein the control unit determines the measurement value for the torque of the drive unit based on the sensor values, in particular in combination with characteristic values of the drive unit that are stored in the control unit.

The measurement value can advantageously be determined from the sensor value and at least one bearing characteristic value, wherein in particular the bearing characteristic value is a tensile, bending and/or torsional rigidity. In this case, according to the invention the bearing characteristic value can be stored in sensor electronics of the at least one sensor and/or in the control unit for example, so that the bearing characteristic value, in combination with the sensor value, determines the measurement value for the torque of the drive unit by means of an algorithm or heuristically. The bearing characteristic value for the at least one particularly elastically embodied bearing of the drive unit arises for example from the geometry of the bearing and/or the material used for the bearing, so that said bearing characteristic value is an essentially fixed or constant characteristic value that is essentially invariant, so that said characteristic value can be used as a reliable calculation parameter for the determination of the measurement value from the sensor value. The known tensile, bending and/or torsional rigidity of the bearing is thus a calculation parameter for the algorithm and/or heuristically, so that said calculation parameter in combination with the measured sensor value can determine the torque of the drive unit. It is thus possible to recalculate the applied torque from the measured sensor values, which are difference values for a change in force and/or position, in particular a relative twist of the drive unit, by using the bearing characteristic values that are assumed to be known.

According to the invention, the drive unit can preferably comprise at least two bearings for connecting to at least one fixed support point.

The at least two bearings are preferably disposed on the drive unit so as to be spaced apart from each other or are connected to the drive unit, wherein at least one sensor is preferably disposed on each bearing, so that a number of sensor values can be measured on the bearings of the drive unit. For example, it is conceivable that at least one bearing experiences a pressure force from the applied torque and a further bearing is loaded by a tensile force as a result of the torque. Moreover, the change in position, in particular a relative twist of the drive unit, can also be measured on at least two bearings, in particular bearings that are disposed spaced apart from each other, and can be used in the calculation or the determination of the measurement value from the sensor values. This results in a more reliable measurement of the torque, wherein scatter of the measurement values because of the number of sensor values can be reduced, so that the torque can be determined more precisely.

Advantageously, at least one sensor can be disposed on the drive unit and/or the bearing and at least one sensor can be disposed on the fixed support point. Using at least one sensor on the drive unit and/or the bearing and at least one sensor on the fixed support point, sensor values are measured that can be compared with each other, so that in the case of an unchanged sensor value of the fixed support point and a sensor value that has changed compared thereto on the drive unit and/or the bearing, the relative change in position and/or the change in force are measured and compared with each other. As a result thereof, a more precise measurement result for the torque on the drive unit can be determined, because the sensor value of the sensor on the fixed support point essentially does not change as a result of an applied torque, so that a baseline value or reference value is provided compared to the varying sensor value at the drive unit or the bearing. It is further conceivable that at least one sensor is a distance sensor, in particular a capacitive sensor, an optical sensor or an acoustic sensor. In this case, a distance sensor according to the invention can be disposed on the drive unit, the bearing, or the fixed support point, and can measure a change in the position of the drive unit as a result of an applied torque of the drive unit. The distance sensor is disposed on the drive unit in this case, wherein there is preferably a reference measurement point at the fixed support point, so that in the event of a change in the position of the drive machine a change in distance relative to the reference measurement point can be measured using an optical sensor. A capacitive distance measurement can for example be carried out on a selected bearing, wherein for example the one elastic bearing at a selected point consists for example of a metallic bolt, of a non-conductive elastic isolating sleeve and a conducting sleeve of two halves that is fixed to the vehicle, wherein the second half of the sleeve is insulated against the first half of the sleeve. The bolt and the conductive sleeve are connected in the manner of a plate capacitor. The capacitance of said sensor varies with the separation of the two parts. The applied reaction moment and hence the torque can be concluded from the change in the capacitance. Instead of the bolt and the sleeve, alternatively mutually isolated surfaces can be used, the separation of which changes during a deformation caused by applying torque. Moreover, it is conceivable that ribs that engage within each other are configured as a capacitor. The change in the degree of overlap of the ribs because of an applied torque results in a change in the capacitance, from which the torque applied by the machine can be concluded. An acoustic sensor can for example be an ultrasonic sensor that measures a change in the position of the drive machine relative to the fixed support point, for example the body, by means of ultrasound.

In the context of the invention, at least one sensor can be provided, an inertial sensor, in particular an acceleration sensor, or a Hall sensor, whereby a relative angular position of the drive unit can be determined. In this case, at least one acceleration sensor is preferably disposed on the elastic bearing. The drive unit is twisted through the angle $\alpha$ by the loading as a result of the torque, because of the elastic bearing. Accordingly, the measurement value of the acceleration sensor also changes, wherein said measured value is compared with an equivalent measurement value of a sensor with an unchanged position. The angle between the two sensors and therefrom the applied torque can be concluded from the difference of the measurement values. Two acceleration sensors are preferably provided, wherein a positionally fixed sensor and a sensor that is disposed on the drive unit and/or the elastic bearing are provided. The positionally fixed sensor is in this case preferably disposed on the fixed support point and forms a reference system for the measurement. As a result of an applied torque, the measurement value of the positionally changed sensor on the drive unit changes owing to a twisting of the drive unit. The torque can be determined using the changed measurement value and the measurement value of the reference system. A Hall sensor, in particular a 3D magnetic field sensor, uses the Hall effect for the measurement of magnetic fields. A combination of lateral and vertical Hall sensors to form a 3D magnetic field sensor enables position detection and thus detection of a change in position. Such magnetic field sensors measure the positions of machine parts in a contactless and wear-free manner.

It is further conceivable that the sensor is a force transducer, whereby a change in the force on the bearing can be measured. A force transducer or force sensor of this type can for example be a piezo element that is used for the measurement of the pressure-force distribution on the bearings or bearing points of the drive unit. As a result of the torque, a pressure force and/or a tensile force on the corresponding bearing as a result of an applied torque can accordingly be measured. The applied torque can be concluded from the sensor value determined in this way in combination with a bearing characteristic value.

In the context of the invention, at least one sensor can be disposed on a drive machine of the drive unit and/or on a differential gearbox. A drive machine means in the context of the invention a drive unit, in particular an electrical drive unit or a combustion engine, which produces a torque for the drive, for example of a vehicle. Moreover, it is conceivable that at least one sensor is disposed on a differential gearbox of a drive unit. A differential gearbox is in particular to be used if the engine and the drive axle are connected to each other by such a differential gearbox. In this case, it can for example be a vehicle comprising a front engine and driven by means of the rear axle and/or by means of all four wheels. In this case, the torque that is applied to the differential gearbox can be measured, so that the torque on the drive axle can be measured directly, which results in more precise measurement results compared to a torque measurement on the drive machine for rear-wheel drive vehicles.

According to a further aspect of the invention, a measuring system for measuring the torque of a drive unit is claimed. The measuring system for measuring torque is in particular for use for a vehicle drive unit, wherein the measuring system comprises at least one sensor, by means of which a change in a force and/or a position, in particular a relative twist of the drive unit, can be measured. Moreover, the measuring system comprises at least one control unit, wherein the control unit has a signal connection to the at least one sensor, by means of which a torque measurement can be carried out according to the method according to the invention. A measuring system according to the invention thereby has the same advantages as have been described in detail with reference to the method according to the invention.

Further measures that improve the invention arise from the following description of some exemplary embodiments of the invention that are represented schematically in the figures. All features and/or advantages resulting from the claims, the description and the drawings, including design details, spatial arrangements and steps of the method, can be essential to the invention both on their own and in the various combinations. In this case it should be noted that the figures have only a descriptive character and it is not to be thought that they limit the invention in any way.

BRIEF DESCRIPTION OF THE DRAWINGS

In the following figures, the identical reference characters are used for the same technical features, even of different exemplary embodiments. In the figures.

DETAILED DESCRIPTION

Figure 1:
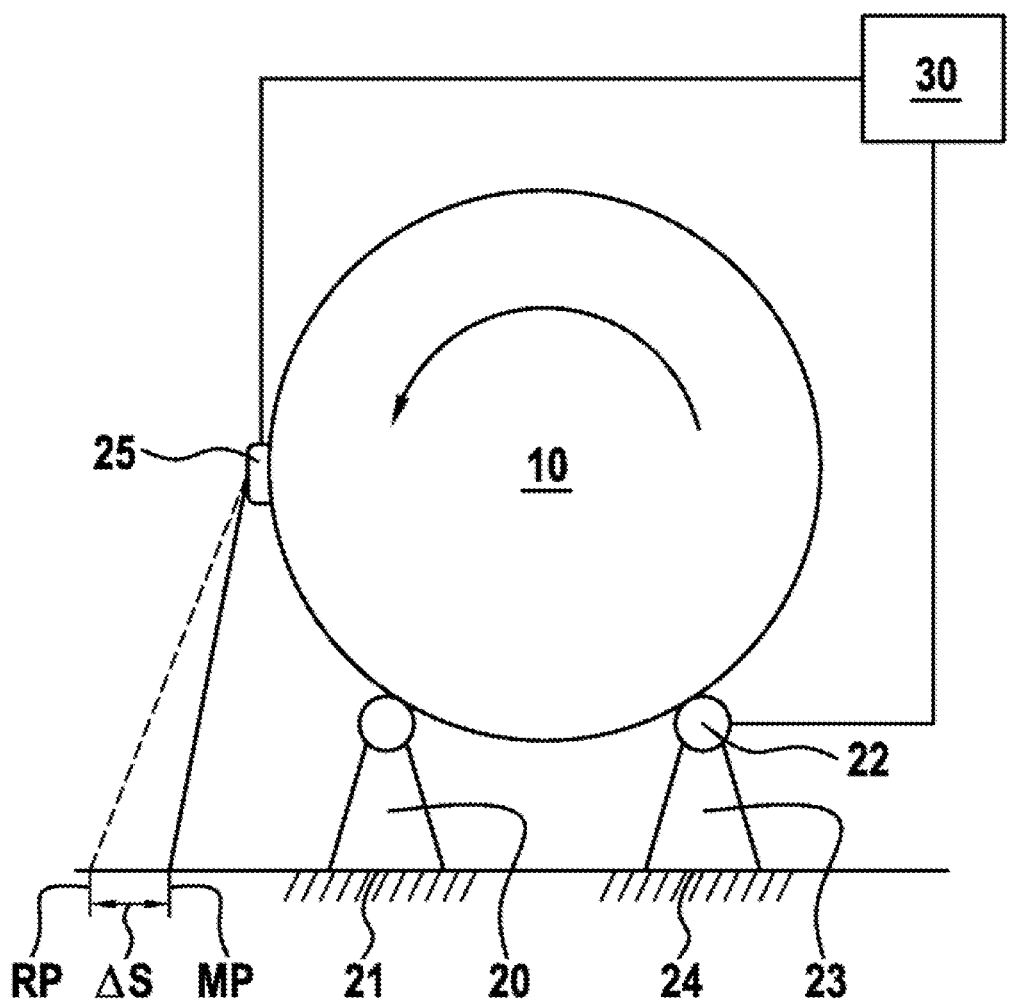
FIG. 1 shows schematically a first embodiment of the measuring system according to the invention and FIG. 2 shows schematically a further embodiment of the measuring system according to the invention.

In FIG. 1, a possible embodiment of the measuring system 100 according to the invention is shown, wherein the measuring system 100 comprises a first sensor 22 that is immovably connected to a bearing 23 of the drive unit 10 with a fixed support point 24. The bearing 23 is in this case essentially embodied elastically, so that in the event of a torque produced by the drive unit 10, a relative change in position, in particular a relative twist about the bearing 23, can be achieved. Moreover, the drive unit 10 in FIG. 1 comprises a second elastic bearing 20 that is connected to the fixed support point 21. A second sensor 25 that is disposed on the drive unit 10 is embodied as a distance sensor 25 and measures a relative change in the position of the drive unit 10. The distance sensor 25 measures the relative change in the position Δs between the reference point RP and the measurement point MP. In this case, the reference point RP forms the comparison value that represents the position of the drive unit 10 without an applied torque. If the drive unit 10 now produces a torque, which is represented by the arrow in the drive unit 10, then the torque produces a relative change in the position of the drive unit 10 about the two bearings 20 and 23. In this case, on the one hand a tensile force on the sensor 22 can be measured, which is produced by a displacement of the drive unit 10 as a result of the torque. At the same time, the drive unit 10 moves by the relative change in position Δs, so that the two sensor values from the sensor 22 and the sensor 25 can be used for the determination of the produced torque. The sensors 22 and 25 in FIG. 1 have a signal connection to the control unit 30. In this case, the control unit 30 carries out the method according to the invention for measuring the torque of the drive unit 10 and thus determines the torque produced based on the sensor values of the sensors 25 and 22 in combination with the known bearing characteristic values of the bearings 20 and 23. By way of example, the support points 21 and 24 represent the body of a vehicle, so that they are fixed reference points for the measurement of the relative change in position and/or change in force. The drive unit 10 in FIG. 1 represents a vehicle drive unit by way of example, in particular a drive machine or a differential gearbox.

Figure 2:
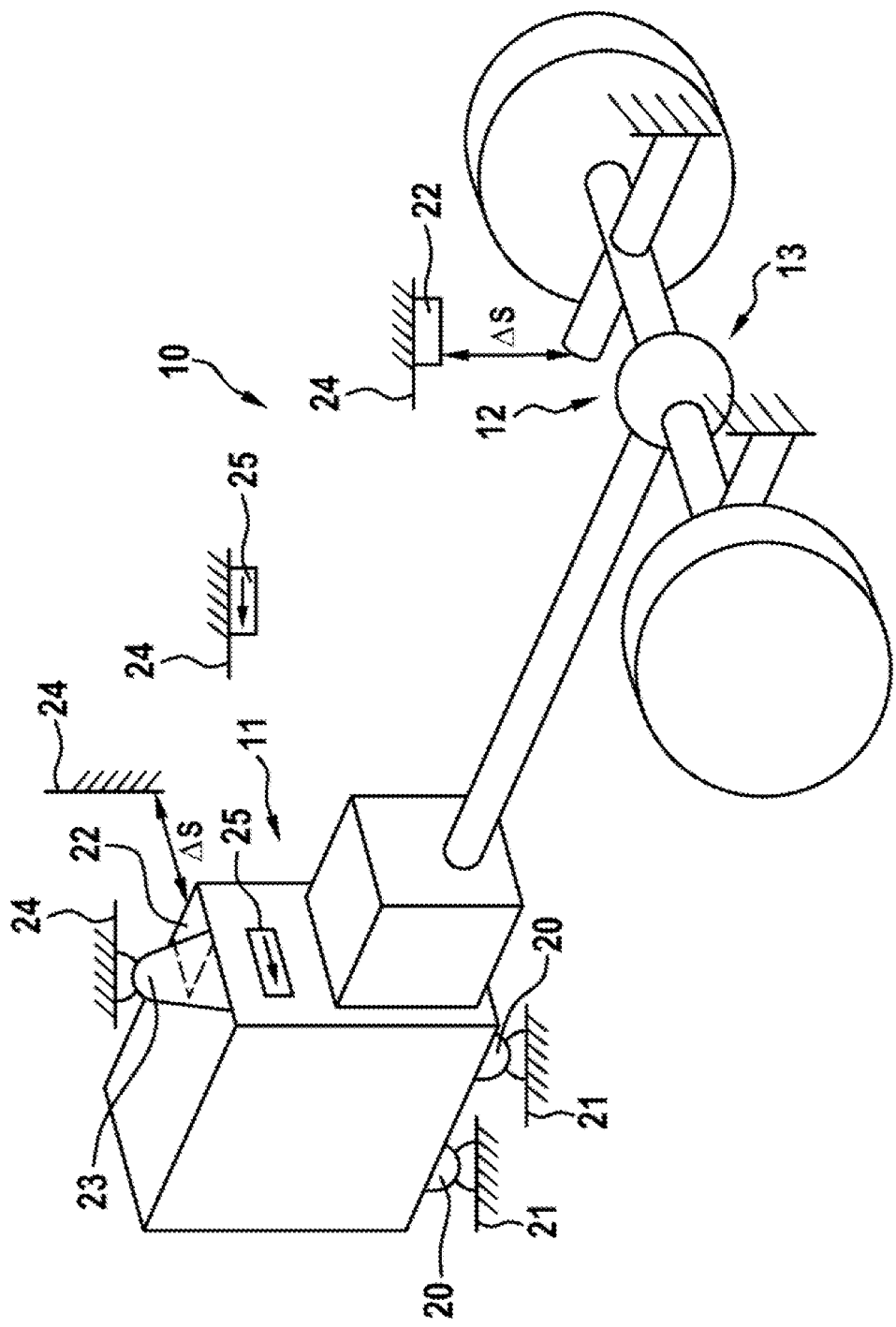

FIG. 2 shows a drive unit 10 comprising a drive machine 11 and a differential/gearbox 12 for the drive of a vehicle. The drive machine 11 is connected by means of two bearings 20 and the bearing 23 to the body 21, 24 as fixed support points. Moreover, a distance sensor 22 is disposed on the drive machine 11 that measures the distance Δs of the drive machine 11 from the fixed support point 24. The distance Δs changes in the event of an applied torque, so that said change can be measured by the sensor 22. Moreover, an acceleration sensor 25 is disposed on the drive machine 11 and on the fixed support point 24 respectively that measures the acceleration of the drive machine 11 or the fixed support point and detects a relative change in position thereof. In this case, the arrow in the sensors 25 indicates the acceleration vector. Two acceleration sensors 25 are provided here, wherein a positionally fixed sensor 25 and a sensor 25 that is disposed on the drive machine 11 are provided. The positionally fixed sensor 25 is disposed on the fixed support point 24 in this case and forms a reference system for the measurement. As a result of an applied torque, the measurement value of the variable position sensor 25 on the drive machine 11 changes as a result of twisting of the drive unit 10. The torque can be determined using the changed measurement value and the measurement value of the reference system. The applied torque can be derived from the differing values for $a_x$ and $a_y$, by using the assumed torsional rigidity of the bearing 20, 23. The drive unit 10 comprises a differential 12 in FIG. 2, with which a torque of the drive machine 11 can be transmitted to a drive axle 13 by means of the differential 12. If a torque is applied to the differential 12 and accordingly to the drive axle 13, then the distance Δs from the drive axle 13 to the fixed support point 24 changes. Said distance Δs is measured by the sensor 22 on the fixed support point 24, so that the torque applied to the differential 12 or the drive axle 13 can be determined.

The above descriptions of the embodiment describe the present invention exclusively within the context of examples. Of course, individual features of the embodiment, if technically meaningful, can be freely combined without departing from the scope of the present invention.

What is claimed is:

1. A method for measuring the torque of a drive unit (10) on a vehicle, wherein the drive unit is configured to power a drive shaft, wherein the drive unit (10) comprises at least one bearing for connecting to a vehicle body, the method comprising providing at least one sensor, wherein the at least one sensor includes a sensor that is disposed on the at least one bearing, wherein the at least one sensor measures an angular position of the drive unit (10) relative to the vehicle body as a sensor value, and the method including determining a torque that is applied to the drive unit (10) as a measurement value from the sensor value.

2. The method as claimed in claim 1, characterized in that a control unit (30) is provided, wherein the control unit (30)

has a signal connection to the at least one sensor (22) and determines the measurement value from the sensor value.

3. The method as claimed in claim 1, characterized in that the measurement value is determined from the sensor value and at least one bearing characteristic value.

4. The method as claimed in claim 1, characterized in that the drive unit (10) comprises a second bearing (20) for connecting to the vehicle body.

5. The method as claimed in claim 1, characterized in that the at least one sensor includes a first sensor disposed on the drive unit (10) and a second sensor disposed on the at least one bearing (23).

6. The method as claimed in claim 1, characterized in that the at least one sensor includes a distance sensor.

7. The method as claimed in claim 1, characterized in that the at least one sensor is an inertial sensor, whereby a relative angular position angle of the drive unit (10) can be determined.

8. The method as claimed in claim 1, characterized in that the sensor is a force transducer, whereby a change in the force on the bearing can be measured.

9. The method as claimed in claim 1, characterized in that the at least one sensor includes a sensor that is disposed on a drive machine (11) of the drive unit (10).

10. A measuring system for measuring the torque of a vehicle drive unit (10) that powers a drive shaft and includes at least one bearing (20) for connection to a vehicle body, the measuring system comprising at least one sensor, wherein the at least one sensor includes a sensor arranged on the at least one bearing (30), wherein the at least one sensor is configured to measure an angular position of the drive unit (10) relative to the vehicle body, and at least one control unit (30), wherein the control unit (30) has a signal connection to the at least one sensor and is configured to carry out a torque measurement according to the method as claimed in claim 1.

11. A measuring system for measuring the torque of a vehicle drive unit (10), the measuring system comprising at least one sensor configured to measure a relative twist of the drive unit (10) relative to a vehicle body, and at least one control unit (30), wherein the control unit (30) has a signal connection to the at least one sensor and is configured to carry out a torque measurement according to the method as claimed in claim 1.

12. A method for measuring the torque of a vehicle drive unit (10), wherein the drive unit (10) comprises at least one bearing for connecting to a fixed support point, the method comprising providing at least one sensor that measures a relative twist of the drive unit (10) relative to a vehicle body, and determining a torque that is applied to the drive unit (10) as a measurement value from the sensor value.

13. The method as claimed in claim 1, characterized in that the measurement value is determined from the sensor value and at least one bearing characteristic value, wherein the bearing characteristic value is a tensile, bending and/or torsional rigidity.

14. The method as claimed in claim 1, characterized in that the at least one sensor is a capacitive sensor, optical sensor or acoustic sensor.

15. The method as claimed in claim 1, characterized in that the at least one sensor is an acceleration sensor or a Hall sensor, whereby a relative angular position of the drive unit (10) can be determined.

16. The method as claimed in claim 1, characterized in that the drive unit includes a differential gearbox (12), and wherein the at least one sensor is disposed on the differential gearbox (12).

17. The method as claimed in claim 1, wherein the drive unit is an electrical drive unit.

18. The method as claimed in claim 1, wherein the drive unit is a combustion engine.

19. The method as claimed in claim 1, wherein the drive shaft is coupled to a front axle and set of wheels, and wherein the drive unit is one of an electrical drive unit or a combustion engine.

20. The measuring system as claimed in claim 10, wherein the drive unit is an electrical drive unit.

21. The measuring system as claimed in claim 10, wherein the drive unit is a combustion engine.

22. The measuring system as claimed in claim 10, wherein the drive shaft is coupled to a front axle and set of wheels, and wherein the drive unit is one of an electrical drive unit or a combustion engine.

* * * * *